(12) United States Patent
McArthur et al.

(10) Patent No.: US 12,465,453 B2
(45) Date of Patent: Nov. 11, 2025

(54) MARKER INSERTER

(71) Applicant: Merit Medical Systems, Inc., South Jordan, UT (US)

(72) Inventors: Gregory R. McArthur, Sandy, UT (US); Michael Dean Haslam, Sandy, UT (US)

(73) Assignee: Merit Medical Systems, Inc., South Jordan, UT (US)

( * ) Notice: Subject to any disclaimer, the term of this patent is extended or adjusted under 35 U.S.C. 154(b) by 68 days.

(21) Appl. No.: 18/320,686

(22) Filed: May 19, 2023

(65) Prior Publication Data

US 2023/0372052 A1 Nov. 23, 2023

Related U.S. Application Data

(60) Provisional application No. 63/365,106, filed on May 20, 2022.

(51) Int. Cl.
*A61B 90/00* (2016.01)
*A61B 17/00* (2006.01)

(52) U.S. Cl.
CPC .... *A61B 90/39* (2016.02); *A61B 2017/00367* (2013.01); *A61B 2090/3908* (2016.02); *A61B 2090/3983* (2016.02); *A61B 2090/3987* (2016.02)

(58) Field of Classification Search
CPC .......... A61B 90/39; A61B 2017/00367; A61B 2090/3908; A61B 2090/3983; A61B 2090/3987
See application file for complete search history.

(56) References Cited

U.S. PATENT DOCUMENTS

| | | | |
|---|---|---|---|
| 8,670,818 B2 * | 3/2014 | Ranpura | A61B 90/39 600/431 |
| 9,192,500 B1 * | 11/2015 | Longo | A61B 90/39 |
| 10,357,328 B2 * | 7/2019 | Field | A61B 90/39 |
| 11,064,995 B2 * | 7/2021 | Johnson | A61B 17/0483 |
| 2001/0014778 A1 * | 8/2001 | Worm | A61B 10/0266 600/564 |
| 2003/0216755 A1 * | 11/2003 | Shikhman | A61B 17/0057 606/144 |
| 2004/0127765 A1 * | 7/2004 | Seiler | A61N 5/1007 600/7 |
| 2006/0184090 A1 * | 8/2006 | Davis | A61B 90/39 604/19 |
| 2006/0241411 A1 * | 10/2006 | Field | A61B 90/39 600/431 |
| 2009/0209804 A1 * | 8/2009 | Seiler | A61B 17/3478 600/7 |
| 2011/0028836 A1 * | 2/2011 | Ranpura | A61B 90/39 600/432 |
| 2020/0345344 A1 * | 11/2020 | Johnson | A61B 17/0483 |
| 2022/0061833 A1 * | 3/2022 | Peter | A61B 17/0467 |
| 2022/0168141 A1 * | 6/2022 | Nazzaro | A61F 9/0017 |

* cited by examiner

*Primary Examiner* — Adil Partap S Virk
(74) *Attorney, Agent, or Firm* — Dorsey & Whitney LLP

(57) ABSTRACT

A device, and related systems and methods, for inserting a marker into a patient's body. The device may comprise a retention mechanism to hold the device in a first, undeployed, state. The device may be inserted into a patient's body in the first state, transitioned by the user into a second state wherein the retention mechanism is overcome, and then transition the device into a third state to deliver a marker to a precise location. The device may then be removed from the patient's body.

16 Claims, 20 Drawing Sheets

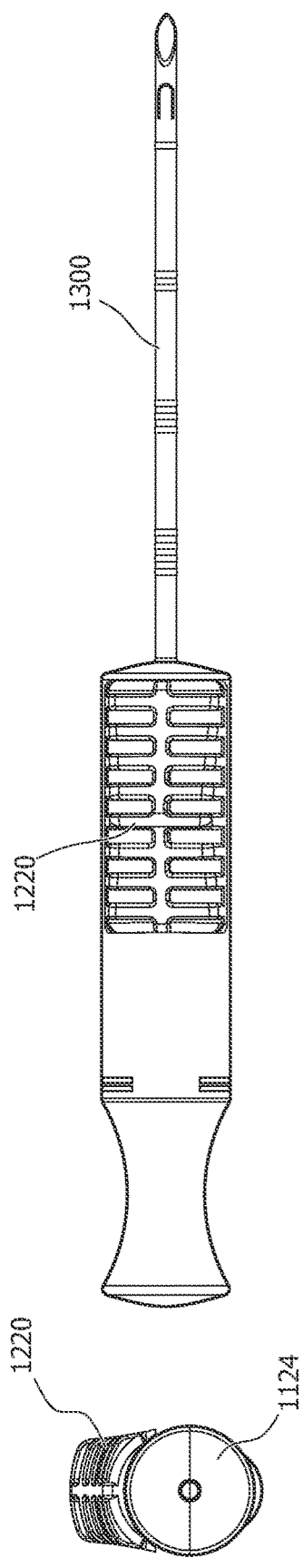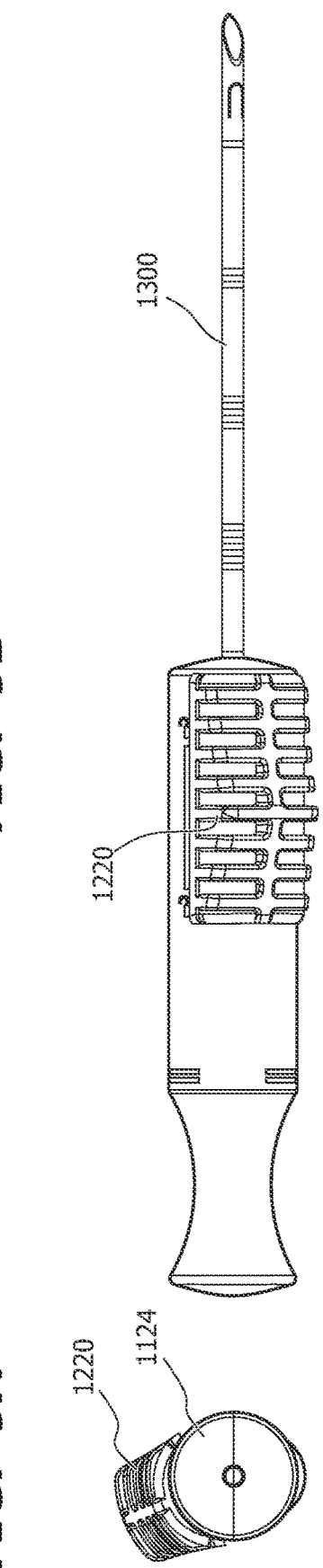
FIG. 9A  FIG. 9B  FIG. 10A  FIG. 10B

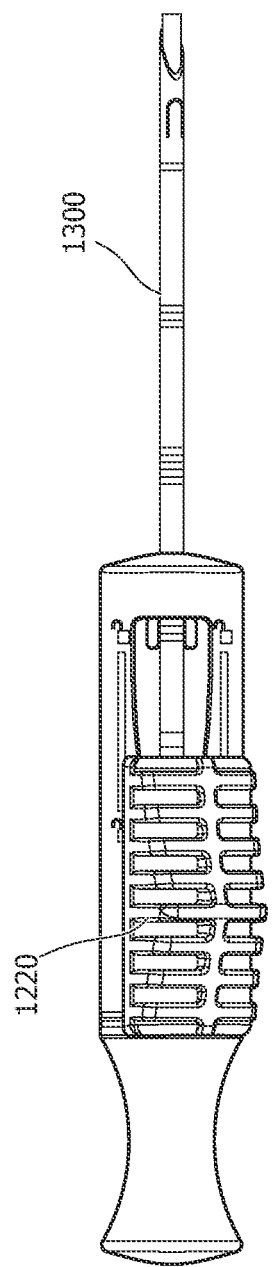
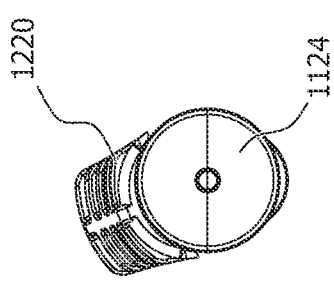
FIG. 11B
FIG. 11A

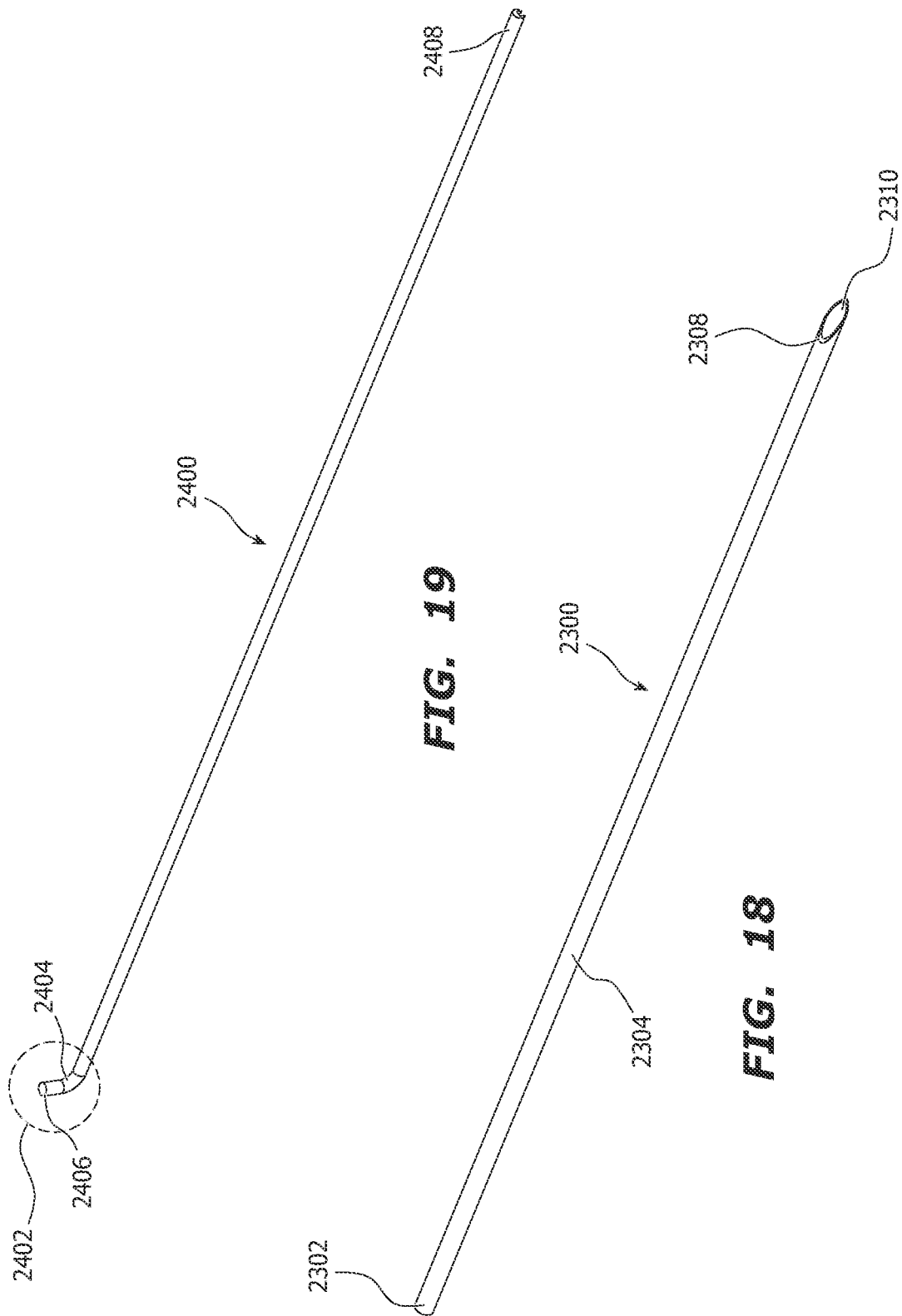

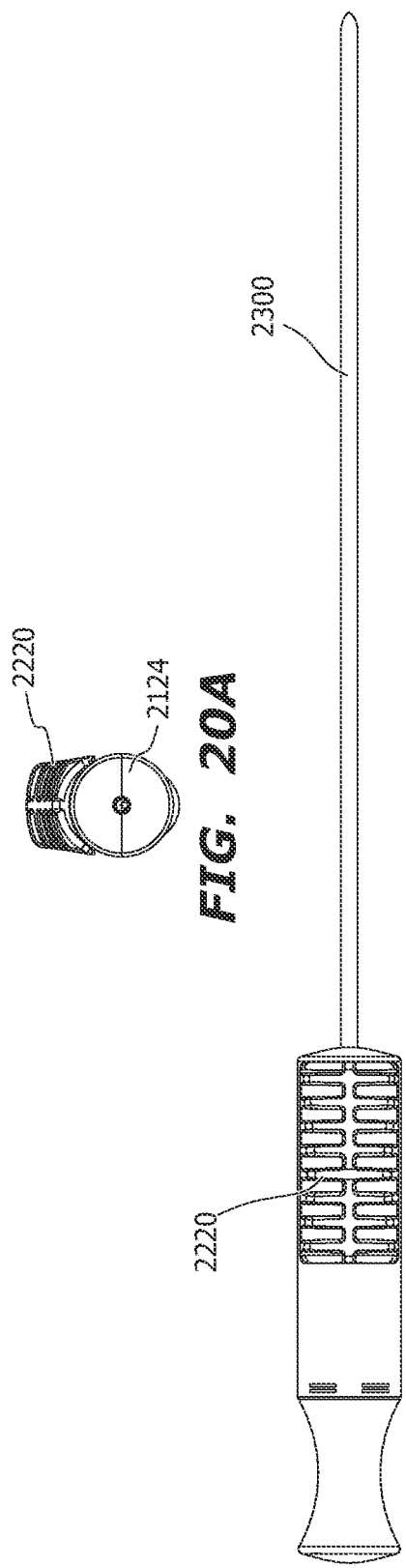
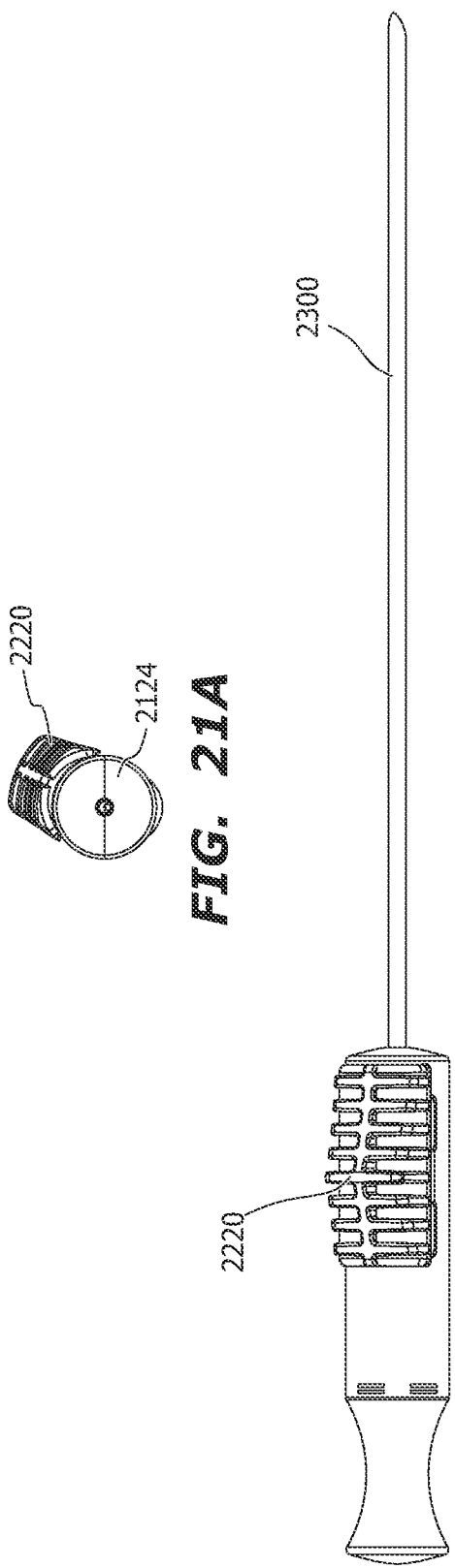

MARKER INSERTER

RELATED CASES

This application claims priority to U.S. Provisional Application No. 63/365,106, filed on May 20, 2022, and titled "MARKER INSERTER," which is hereby incorporated by reference in its entirety.

TECHNICAL FIELD

The present disclosure relates generally to devices, systems, and methods for placing a marker, for example in the field of tumor or cancer localization. More particularly, some embodiments relate to lumpectomy, and localization in preparation for lesion removal.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 9A is a front view of an exemplary embodiment of the marker inserter device in a first position of FIG. 1.

FIG. 9B is a side view of an exemplary embodiment of the marker inserter device in a first position of FIG. 1.

FIG. 10A is a front view of an exemplary embodiment of the marker inserter device in a second position of FIG. 1.

FIG. 10B is a side view of an exemplary embodiment of the marker inserter device in a second position of FIG. 1.

FIG. 11A is a front view of an exemplary embodiment of the marker inserter device in a third position of FIG. 1.

FIG. 11B is a side view of an exemplary embodiment of the marker inserter device in a third position of FIG. 1.

FIG. 18 is an exemplary embodiment of a cannula of the marker inserter device of FIG. 12.

FIG. 19 is an exemplary embodiment of a stylet of the marker inserter device of FIG. 12.

FIG. 20A is a front view of an exemplary embodiment of the marker inserter device in a first position of FIG. 12.

FIG. 20B is a side view of an exemplary embodiment of the marker inserter device in a first position of FIG. 12.

FIG. 21A is a front view of an exemplary embodiment of the marker inserter device in a second position of FIG. 12.

FIG. 21B is a side view of an exemplary embodiment of the marker inserter device in a second position of FIG. 12.

DETAILED DESCRIPTION

Figure 1:
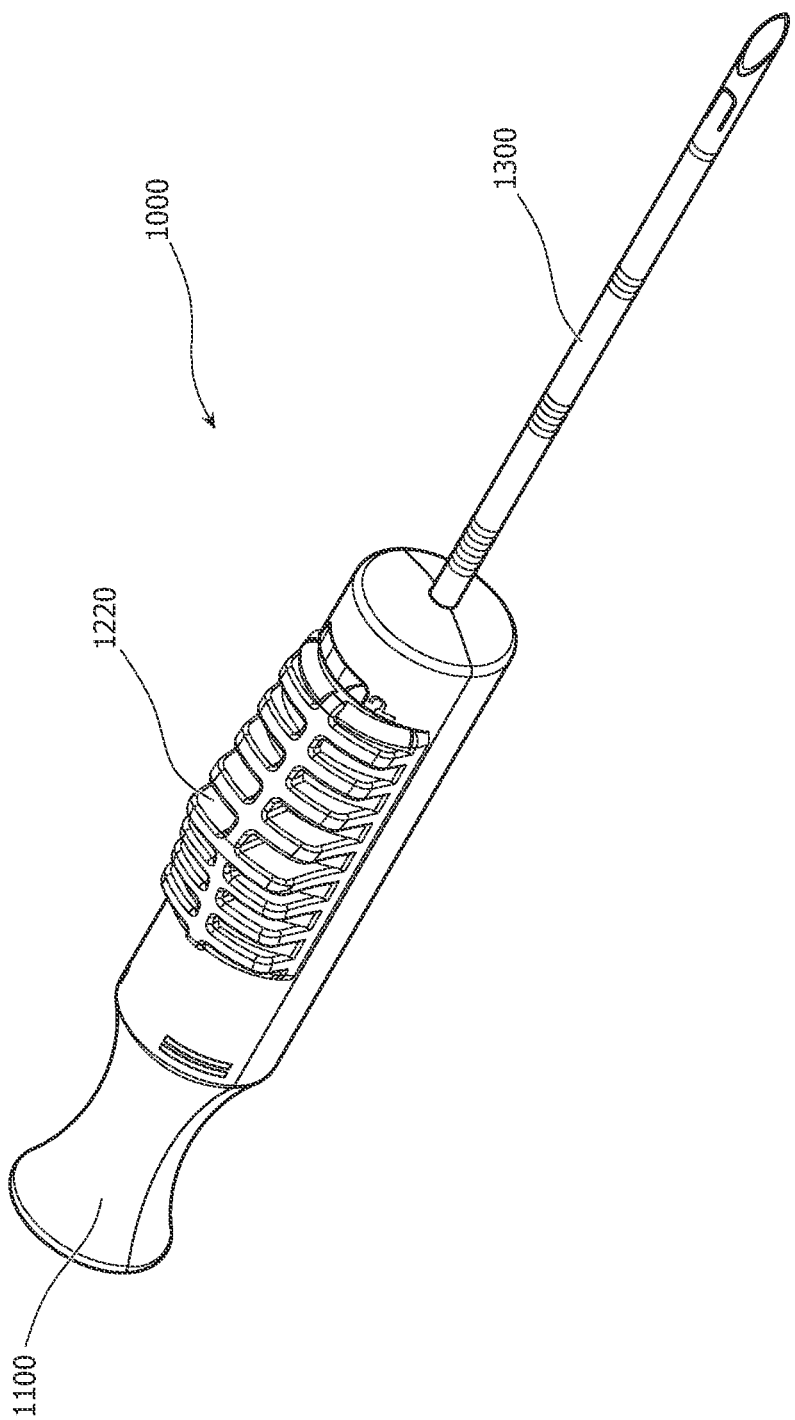
FIG. 1 is an exemplary embodiment of a marker insertion device.
Figure 2:
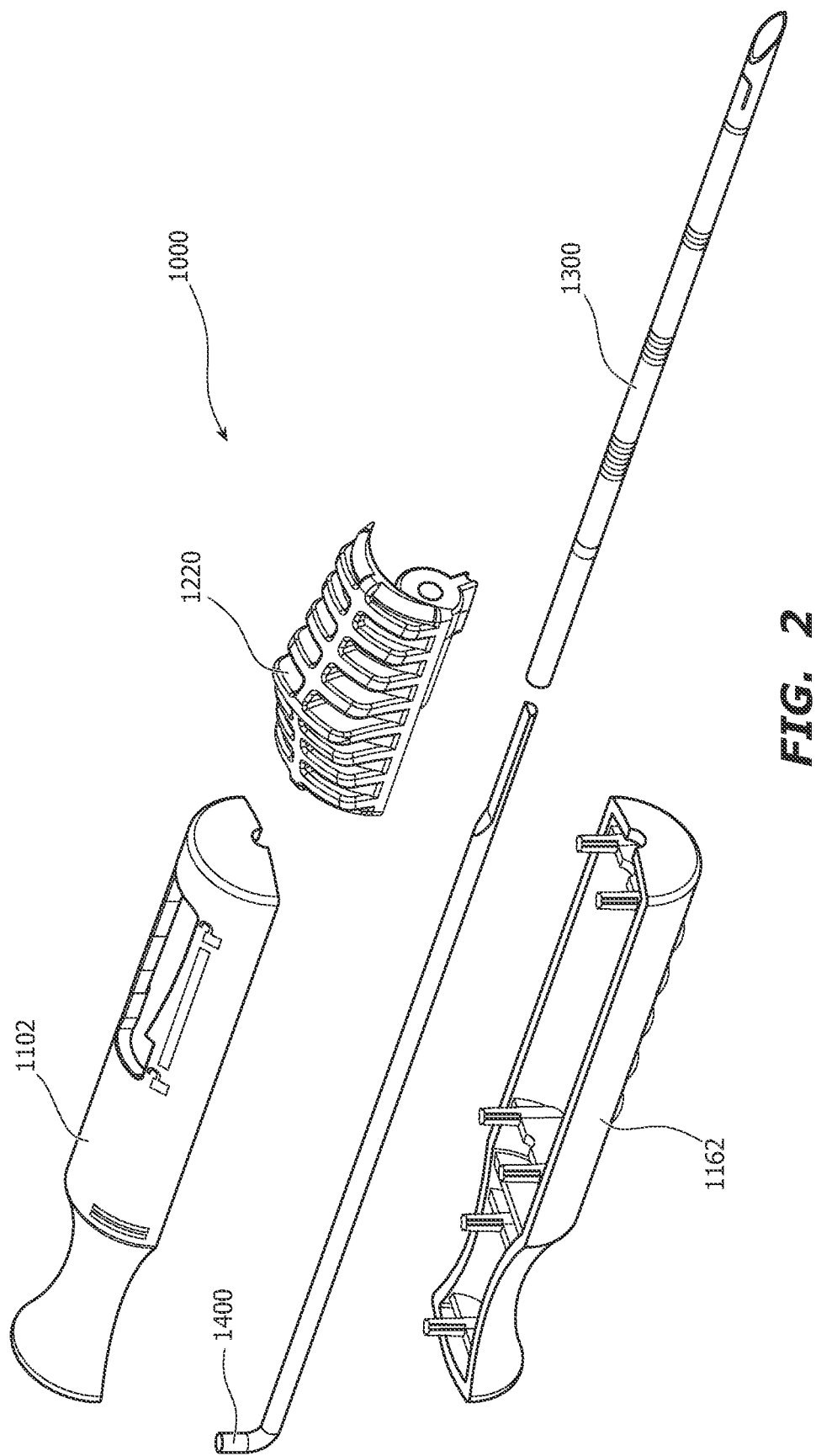
FIG. 2 is an exploded view of an exemplary embodiment of the marker insertion device of FIG. 1.

Before a biopsy or surgical procedure to remove a lesion within a breast, such as a lumpectomy procedure, the location of the lesion must be identified. For example, mammography or ultrasound imaging may be used to identify and/or confirm the location of the lesion before a procedure. The resulting images may be used by a surgeon during a subsequent procedure to identify the location of the lesion and guide the surgeon, e.g., during dissection to access and/or remove the lesion. Such images may be two dimensional, and therefore provide limited guidance for localization of the lesion.

To facilitate localization in three dimensions, a marker may be placed with an insertion device to provide localization information during a procedure. For example, an insertion device for a marker may be introduced through a breast into a lesion, and in conjunction with mammography or any other standard diagnostic imaging technique, a marker may be deployed from the insertion device into the lesion. The insertion device may then be withdrawn, and the position of the marker may be confirmed using mammography. During a subsequent surgical procedure, a hand-held probe may be placed over the breast to identify a location overlying the marker. An incision may be made and the probe may be used to guide excision of the marker and lesion.

Markers and placement devices within the scope of this disclosure may be used for locating lesions and placing markers at any location within the body. Specific examples given herein, such as placement of a marker within breast tissue to identify a breast cancer lesion, may be analogized to placement within other areas of the body.

A known problem with conventional insertion devices is that the insertion device, through a variety of factors, may be prematurely actuated, resulting in premature or partial delivery and/or loss of precision in marker placement. For example, device may be accidentally actuated during packaging, transportation, or preparation for use. Accidental actuation may be due to a variety of factors, including but not limited to: the design of the actuation mechanism and its handling during packaging, delivery, and pre-operation preparation, the robustness and durability of the actuation mechanism, ease of use provided to the user in deploying the marker, or any combination of these and other additional factors.

Accordingly, there is a need for apparatus and methods for accurately and intuitively placing a marker or other structures in advance of and/or during surgical procedures or diagnostic procedures while maintaining the integrity and security of the deployment mechanism prior to its usage. In some embodiments, devices within the scope of this disclosure may be broadly directed to such a system and methods for inserting structures, including a marker, into the body of a patient.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "coupled to" is broad enough to refer to any suitable coupling or other form of interaction between two or more entities, including mechanical, fluidic and thermal interaction. Thus, two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

The terms "proximal" and "distal" are opposite directional terms. For example, the distal end of a device or component is the end of the component that is furthest from the practitioner during ordinary use. The proximal end refers to the opposite end, or the end nearest the practitioner during ordinary use.

Turning to the drawings, FIGS. 1-11B show an exemplary embodiment of a marker insertion device 1000, or a system for implanting a marker into a patient. Generally, the marker insertion device 1000 may include a housing 1100, a trigger 1220, a cannula 1300, and a stylet 1400. The housing 1100 may comprise a housing top 1102 and housing bottom 1162. The housing top 1102 may comprise a proximal end 1122, a distal end 1124, a main body portion 1126, a grooved portion 1128, indicia 1132, and slot 1140. Slot 1140 may comprise rail portion 1142, catch 1148, and pocket portion 1154. Rail portion 1142 may comprise a right rail 1144 and a left rail 1146. Catch 1148 may comprise right portion 1150 and left portion 1152. Pocket portion 1154 may comprise a left pocket 1156, right pocket 1158, and an end 1160. The housing bottom 1162 may comprise a proximal end 1164, a distal end 1166, a main body portion 1168, a grooved portion 1169, a retaining portion 1170, and a guiding portion 1180. Retaining portion 1170 may comprise deflectable portion 1172 and raised portion 1174. Guiding portion 1180 may comprise proximal end 1182, distal end 1184, gap 1186, top face 1188, left wall 1190, and right wall 1192. Trigger 1220 may comprise an actuator 1222, a connecting portion 1230, a cannula engaging portion 1240, and a housing engaging portion 1250. Actuator 1222 may comprise ribs 1224 and middle rib 1226. Cannula engaging portion 1240 may comprise bore 1242. Housing engaging portion 1250 may comprise a protruding portion 1252 and slot 1254. Cannula 1300 may comprise a proximal end 1302, a main body 1304, a retention mechanism 1306, a distal end 1308 and a bore 1310. Stylet 1400 may comprise a proximal end 1402 and a distal end 1408. Proximal end 1402 may further comprise bend 1404 and engaging portion 1406.

In some embodiments, a marker may be packaged or initially disposed within the marker insertion device 1000 outlined above. Furthermore, embodiments wherein the components of the marker insertion device 1000 outlined above are assembled without a marker in an initial packaging configuration are also within the scope of this disclosure.

In alternative embodiments, the inserter device and/or inserter device system may or may not comprise a protective cover for a sharp, cutting edge of the insertion device.

In alternative embodiments, the system comprising the components may be included in various types of packaging or transportation and organizational components.

Figure 3:
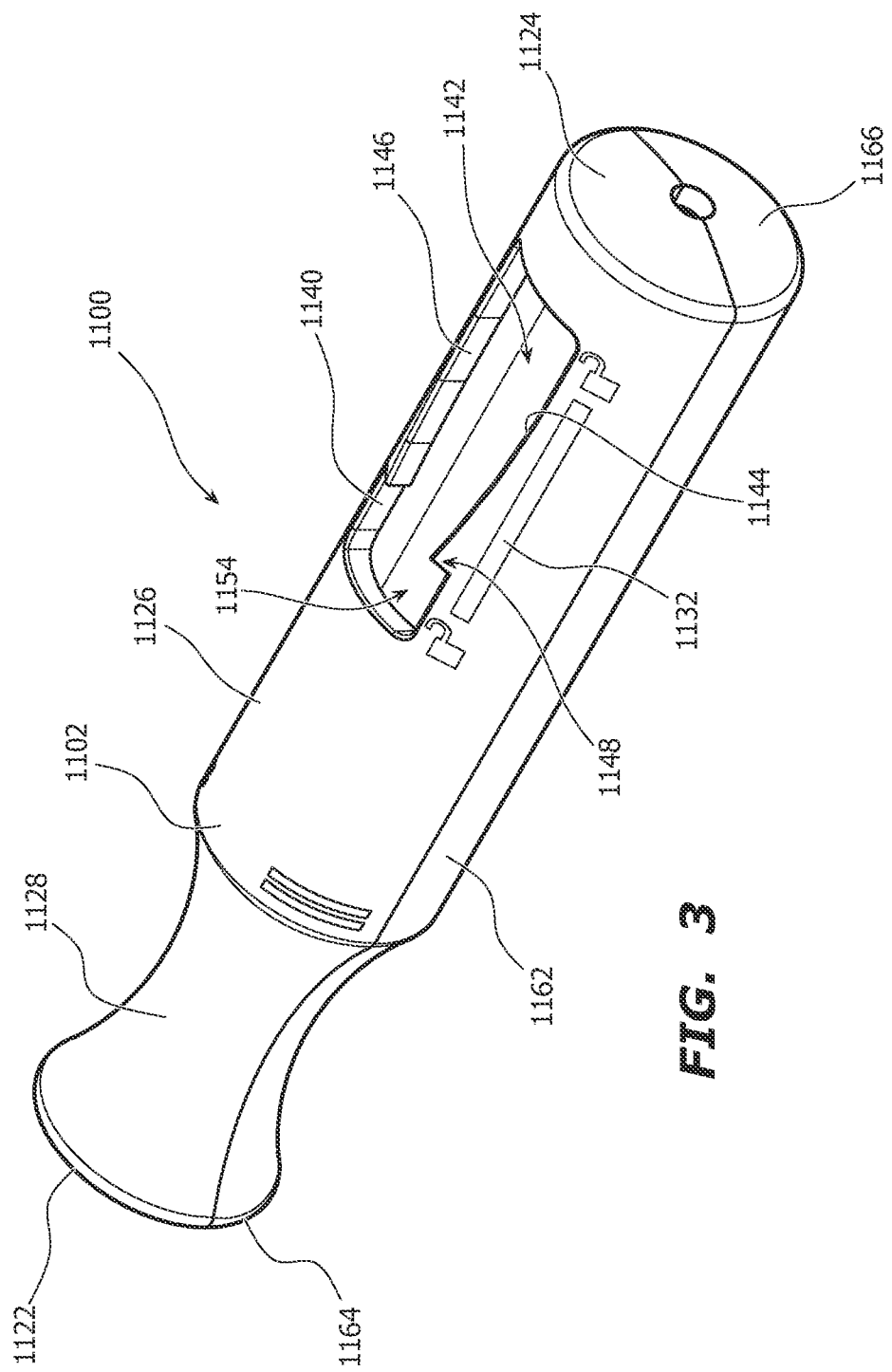
FIG. 3 is an exemplary embodiment of the housing of the marker inserter device of FIG. 1.
Figure 4:
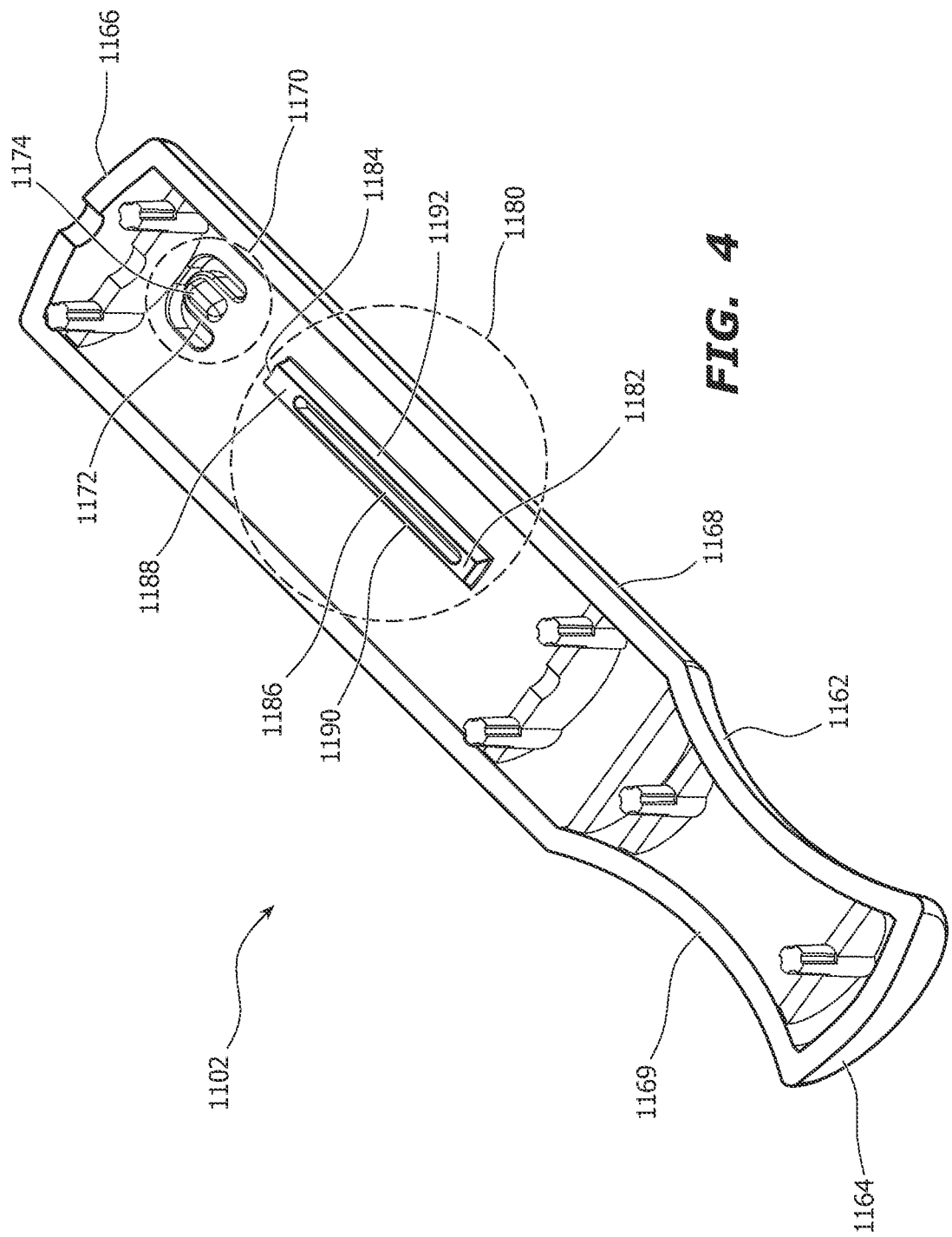
FIG. 4 is an exemplary embodiment of a housing bottom of the marker inserter device of FIG. 1.
Figure 5:
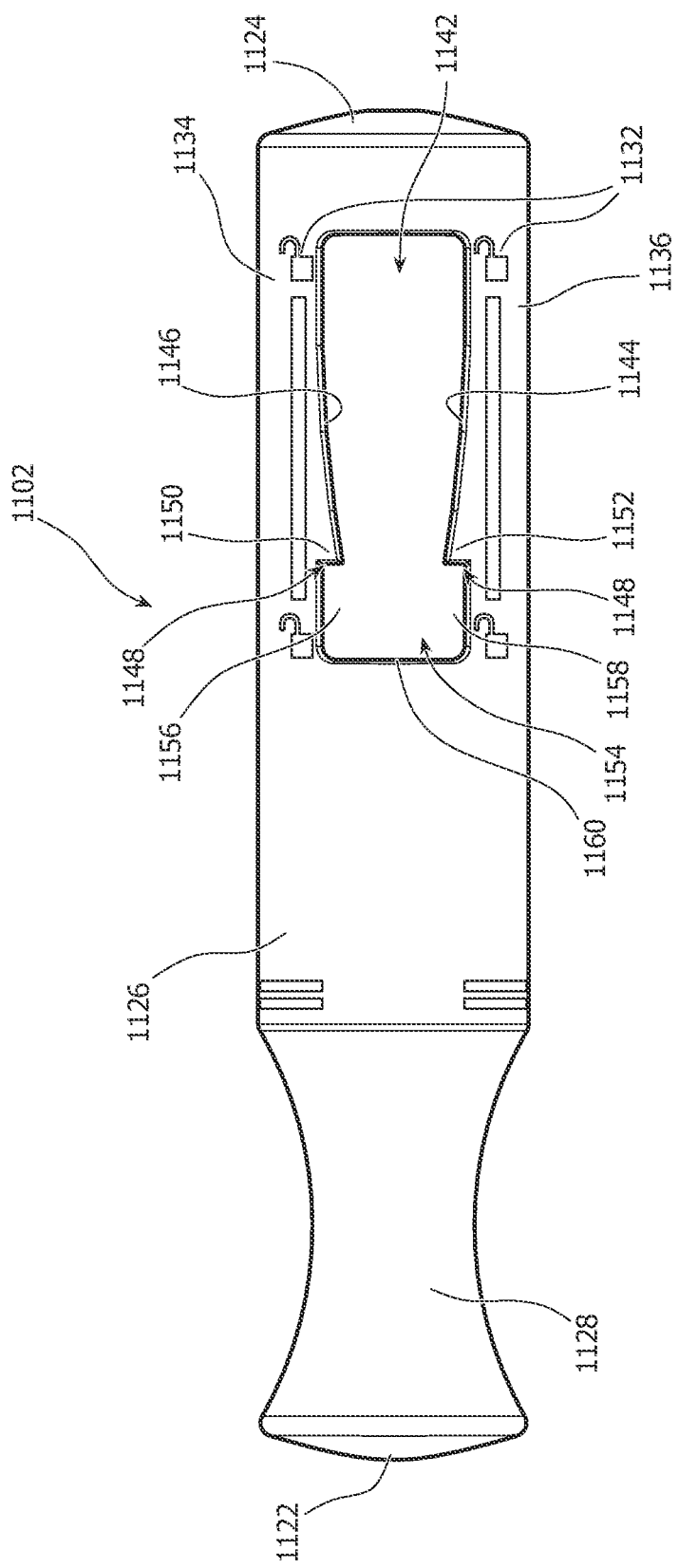
FIG. 5 is an exemplary embodiment of a housing top of the marker inserter device of FIG. 1.

In an exemplary embodiment, FIGS. 3-5 illustrate the housing 1100 of the marker insertion device of FIG. 1, and housing top 1102 and housing bottom 1162 portions. Housing bottom 1162 and housing top 1102 portions may be joined together to form housing 1100 through use of screws, snap fits, adhesives, or any combination of such. A person of ordinary skill in the art, having the benefit of this disclosure, could easily provide multiple methods of joining the housing top 1102 and housing bottom 1162.

FIGS. 3-4 show an exemplary embodiment of the housing bottom 1162 of the marker inserter device 1000 comprising a proximal end 1164, distal end 1166, main body portion 1168, grooved portion 1169, retaining portion 1170 and guiding portion 1180. Retaining portion 1170 may comprise deflectable portion 1172 and raised portion 1174. Deflectable portion 1172 may be separated and/or "finger-like" so as to facilitate deflection. Raised portion 1174 may rise some distance above the deflectable portion 1172 and the inner wall of main body portion 1168. Guiding portion 1180 may comprise proximal end 1182, distal end 1184, gap 1186, top face 1188, left wall 1190, and right wall 1192. Top face 1188 is raised some distance above the inner wall of main body portion 1168.

FIGS. 3 and 5 show an exemplary embodiment of the housing top of the marker inserter device 1000 which may comprise a proximal end 1122, a distal end 1124, a main body portion 1126, a grooved portion 1128, indicia 1132, and slot 1140. Indicia 1132 may comprise a left indicia 1134 and right indicia 1136. It is recognized that a person of ordinary skill in the art, having the benefit of this disclosure, could provide multiple methods and types of indicia 1132.

Slot 1140 may comprise rail portion 1142, catch 1148, and pocket portion 1154. Rail portion 1142 may comprise a right rail 1144 and a left rail 1146. Catch 1148 may comprise right portion 1150 and left portion 1152. Pocket portion 1154 may comprise a left pocket 1156, right pocket 1158, and an end 1160.

Figure 6A:
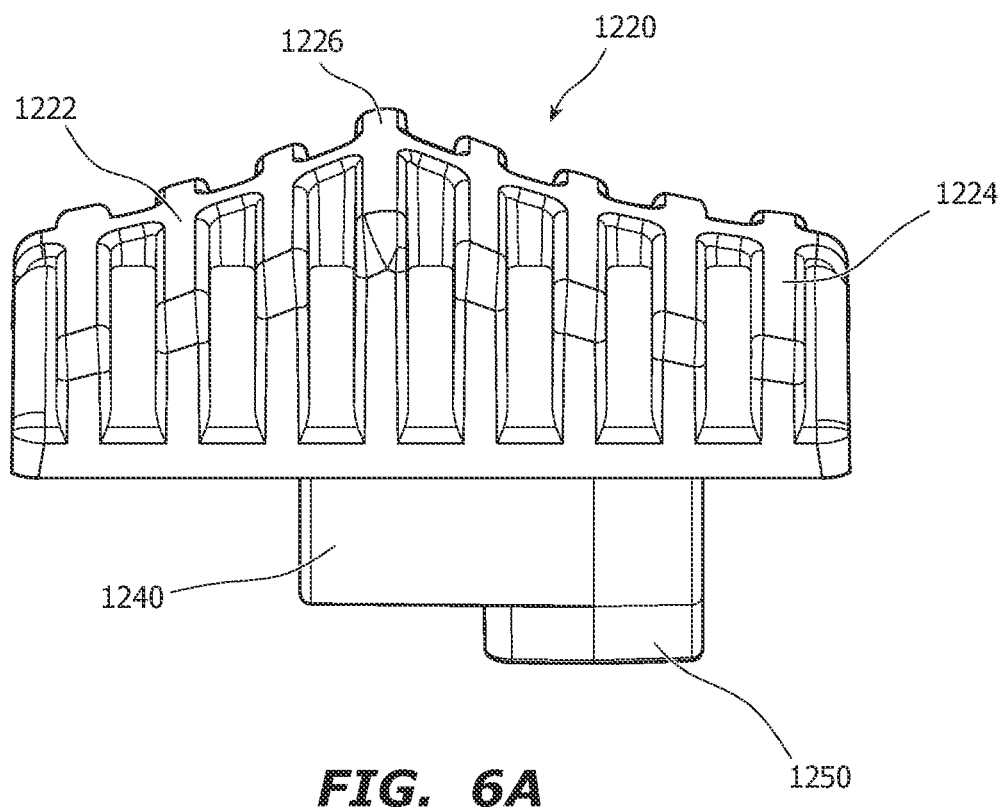
FIG. 6A is a side view of an exemplary embodiment of a trigger of the marker inserter device of FIG. 1.
Figure 6B:
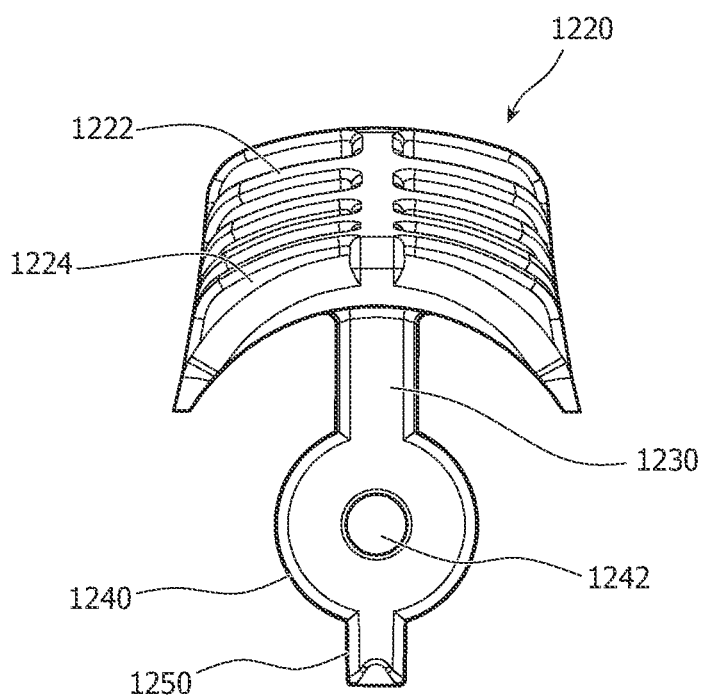
FIG. 6B is a front view of an exemplary embodiment of a trigger of the marker inserter device of FIG. 1.
Figure 6C:
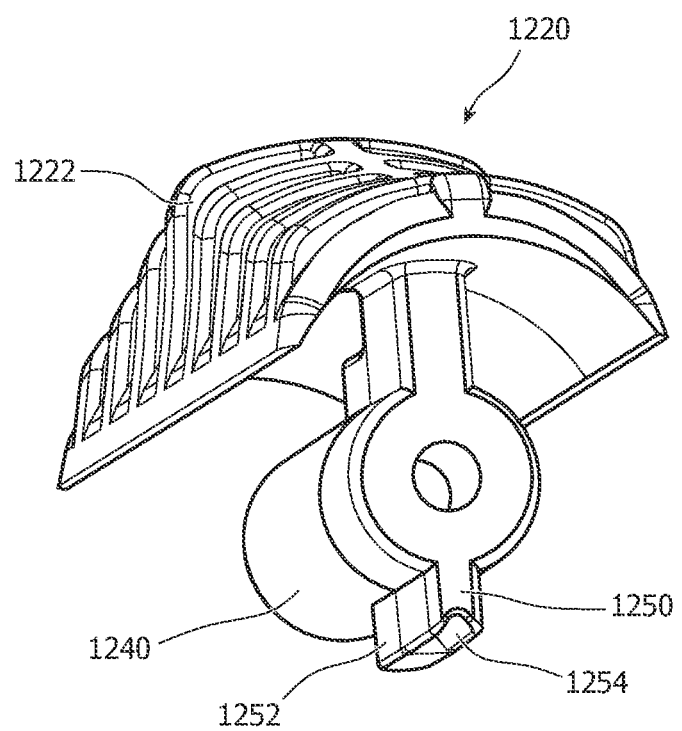
FIG. 6C is a perspective view of an exemplary embodiment of a trigger of the marker inserter device of FIG. 1.

In an exemplary embodiment, FIGS. 6A-6C illustrate the trigger 1220 of the marker inserter device 1000. Trigger 1220 may comprise an actuator 1222, a connecting portion 1230, a cannula engaging portion 1240, and a housing engaging portion 1250. Actuator 1222 may comprise ribs 1224 and middle rib 1226. Cannula engaging portion 1240 may comprise bore 1242, in order to be coupled to cannula 1300. Housing engaging portion 1250 may comprise a protruding portion 1252 and slot 1254.

Figure 7:
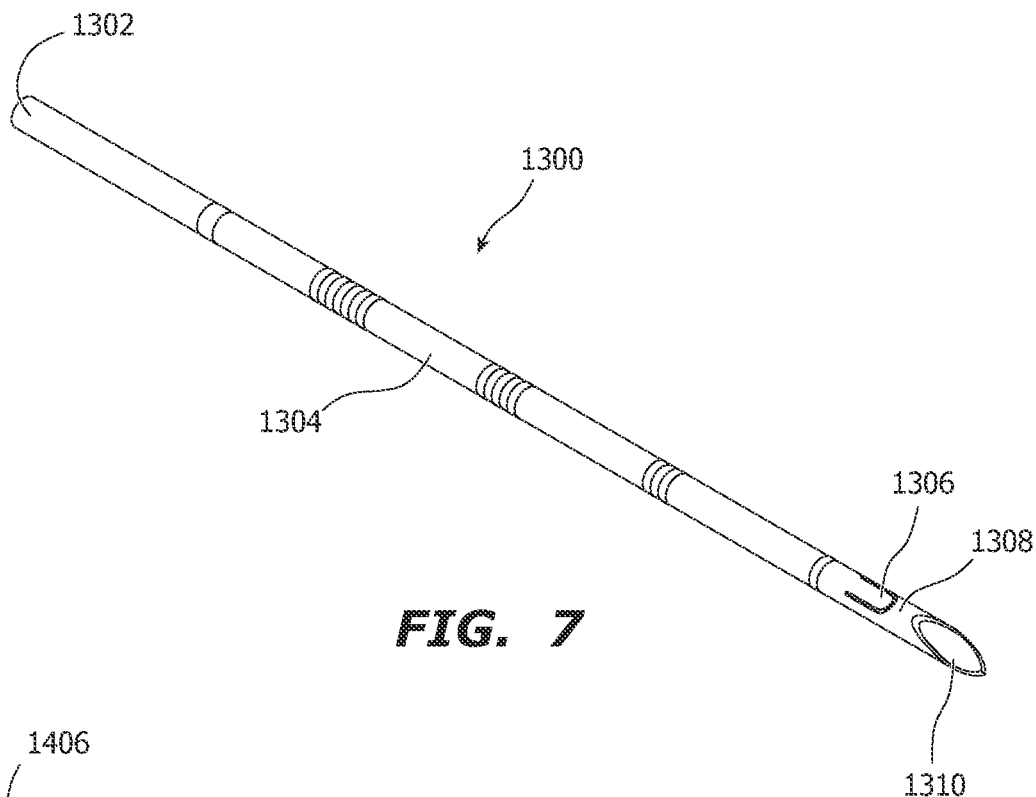
FIG. 7 is an exemplary embodiment of a cannula of the marker inserter device of FIG. 1.

In an exemplary embodiment, FIG. 7 illustrates the cannula 1300 of the marker inserter device 1000. Cannula 1300 may comprise a proximal end 1302, a main body 1304, a retention mechanism 1306, a distal end 1308 and a bore

1310. Retention mechanism 1306 may be configured to hold a marker in place. Cannula 1300 may be fixed to trigger 1220 such that when trigger 1220 is rotated, or withdrawn proximally, cannula 1300 is similarly rotated, or withdrawn proximally.

Figure 8:
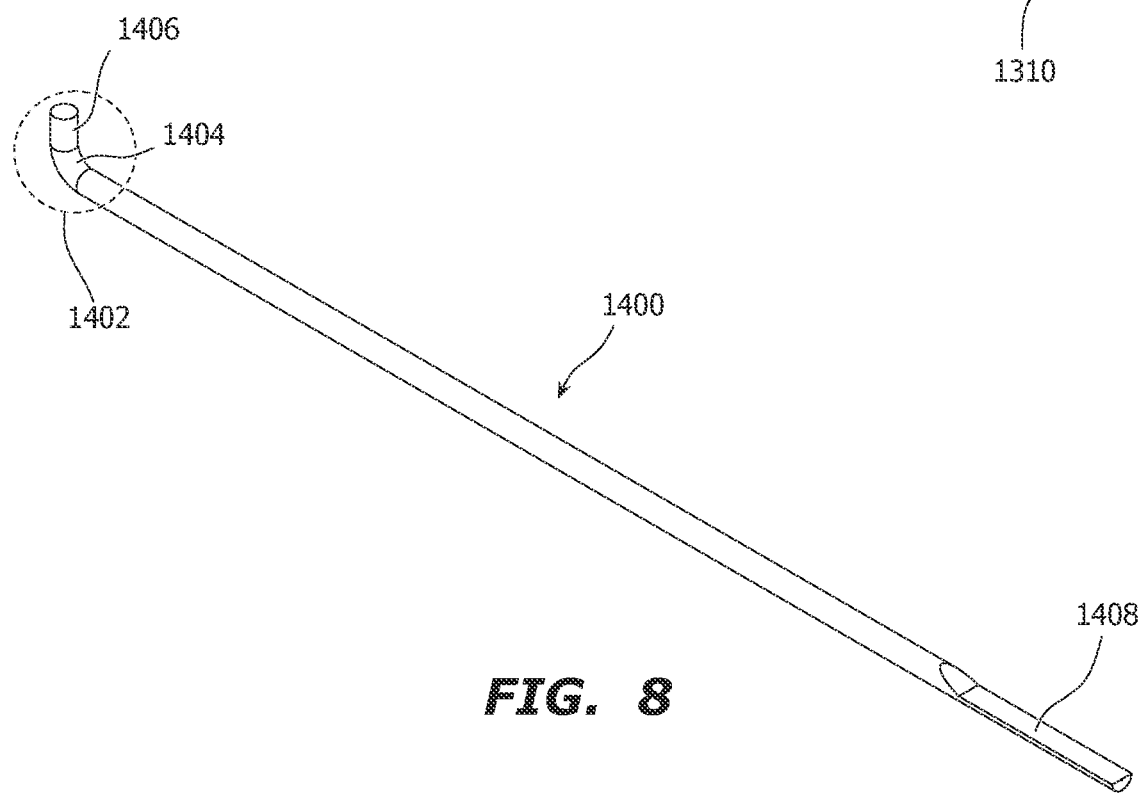
FIG. 8 is an exemplary embodiment of a stylet of the marker inserter device of FIG. 1.

In an exemplary embodiment, FIG. 8 illustrates the stylet 1400 of the marker inserter device 1000. Stylet 1400 may comprise a proximal end 1402 and a distal end 1408. Proximal end 1402 may further comprise bend 1404 and engaging portion 1406. Engaging portion 1406 of stylet 1400 may be fixedly engaged with housing 1100 of the marker. Stylet 1400 may further be slidingly disposed inside of cannula 1300 such that cannula 1300 may be moved with respect to both stylet 1400 and housing 1100. Distal end 1408 of stylet 1400 may be configured to abut and push against a marker to be inserted.

Various types of markers can be used in conjunction with the device. A person of ordinary skill in the art will be able to design or envision various other markers and types of markers that take advantage of radar, x-ray, mammography, RFID, or any other imaging and localization techniques typically used in short-distance localization, particularly in the medical field.

As illustrated in FIGS. 9-11, in an embodiment the device may be in a first position, a second position, or a third position. In the first position, the marker may be undeployed and the inserter device may be ready to be inserted and actuated. The marker may reside in the bore 1310 of the cannula 1300 and may be held in place by retention mechanism 1306. To transition the marker into the second position, the user may rotate the actuator 1222 of the trigger 1220 in either direction about a longitudinal axis of the device. This rotation may overcome a retaining force provided by the retaining portion 1170 of the housing. In the second position, the trigger 1220 may be free to be withdrawn proximally, and in doing so, will withdraw the cannula 1300 proximally. To transition the marker into the third position the user may move the actuator 1222 of the trigger 1220 proximally, to its proximal most position. This will also move cannula 1300 to its proximal most position. In entering the third position, the trigger may move past catch 1148 of housing 1100 such that the trigger and cannula are locked in the third position. The marker may be deployed from the device as the trigger 1220 is moved into the third position.

As seen in FIGS. 9A and 9B, in an embodiment of the device, in the first position cannula 1300 and trigger 1220 may be at their most distal position. In this position housing engaging portion 1250 may be engaged to retaining portion 1170 of the housing bottom 1162. This engagement may serve to provide a frictionally force against rotational movement of the trigger. More specifically, protruding portion 1252 may push against deflectable portion 1172, and cause deflectable portion 1172 to deflect. Protruding portion 1252 may furthermore engage with distal end 1184 of guiding portion 1180. In this first position, raised portion 1174 may furthermore engage with slot 1254 of trigger 1220.

To restrict proximal movement of the trigger 1220 and cannula 1300, a portion of protruding portion 1252 may contact distal end 1184 of guiding portion 1180. In other words, distal end 1184 of guiding portion 1180 may provide a force against proximal movement of trigger 1220.

In some embodiments, to transition into the second position, a user may overcome the frictional force provided by retaining portion 1170 against the trigger 1220 to rotate the trigger around a longitudinal axis of the device. A user may move the actuator 1222 of the trigger to the lateral left or right, thereby rotating the trigger 1220 about a longitudinal axis of the marker inserter. This rotation may cause the housing engaging portion 1250 of the trigger to disengage from the retaining portion 1170 of the housing. More specifically, protruding portion 1252 may disengage from deflectable portion 1172 and slot 1254 may disengage from raised portion 1174.

Actuator 1222 of the trigger 1220 may be moved laterally until connecting portion 1230 of the trigger 1220 contacts either the right rail 1144 or the left rail 1146 of rail portion 1142 of the slot 1140 of the housing top 1102. This movement will also free protruding portion 1252 from engaging with the distal end 1184 of guiding portion 1180, such that trigger 1220 will be free to be retracted proximally.

In the second position the trigger may be retracted proximally, which may cause cannula 1300 to retract. While being retracted proximally, the connecting portion 1230 of the trigger 1220 may be in contact with the rail portion 1142 of the housing top 1102, while the housing engaging portion 1250 of the trigger 1220 may be in contact with the left wall 1190 or right wall 1192 of guiding portion 1180 of the housing bottom. These two contact points on trigger 1220 may guide the trigger 1220 such that trigger 1220 cannot be rotated, only retracted proximally.

In some embodiments, the device may comprise a catch 1148 to lock the device in the third position, or otherwise stated, the device may comprise a catch 1148 such that the device may not be taken out of the third position once it has transitioned into the third position. In some embodiments this catch may comprise right and left portions 1144 and 1146 that provide slight, frictional interference against retraction of the trigger. Once connecting portion 1230, and trigger 1220 has been retracted proximal the catch 1148 and portion 1144 or 1146, portion 114 or 1146 may provide an obstacle and force against the distal movement of the trigger 1220 and connecting portion 1230. In other words, the catch 1148 may serve to provide one-way, proximal motion of the trigger.

Proximal retraction of the trigger may proximally retract cannula 1300, which may serve in delivery of the marker as distal end 1308 of cannula 1300 is retracted proximally past the marker.

Figure 12:
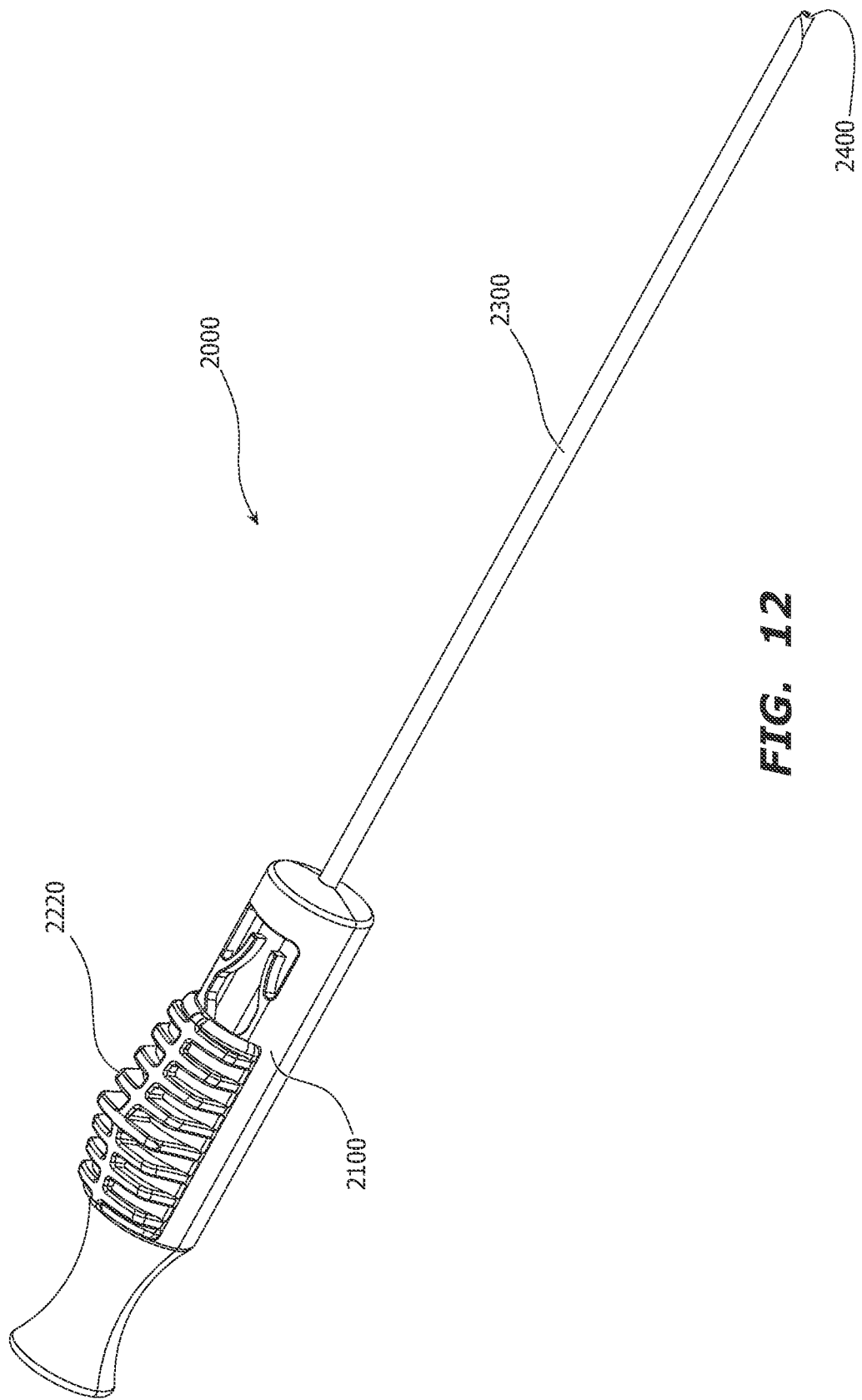
FIG. 12 is an exemplary embodiment of a marker insertion device.
Figure 13:
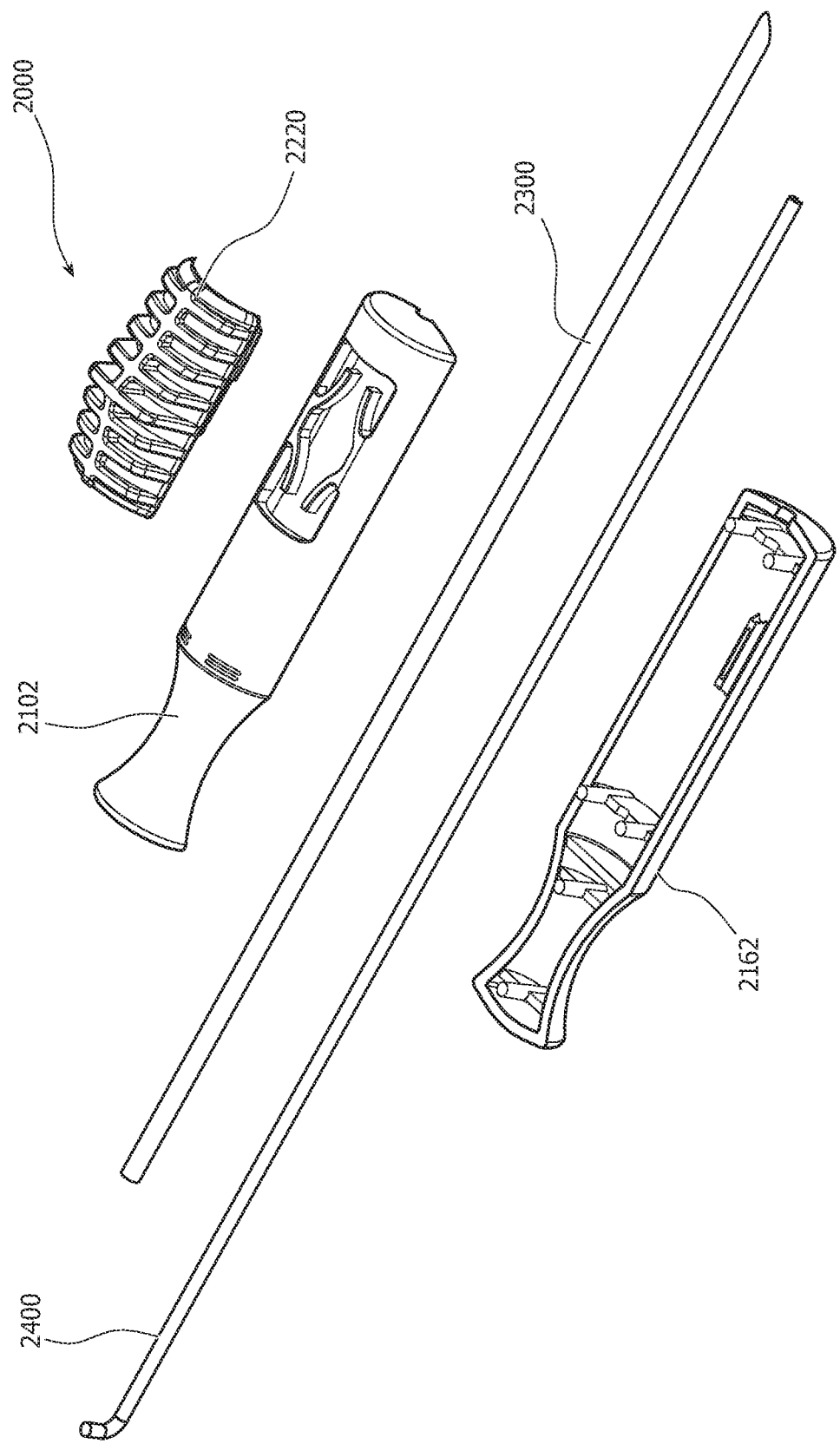
FIG. 13 is an exploded view of an exemplary embodiment of the marker insertion device of FIG. 12.

Turning to the drawings, FIGS. 12 and 13 show an exemplary embodiment of a marker insertion device 2000, or a system for implanting a marker into a patient. Generally, the marker insertion device 2000 may include a housing 2100, a trigger 2220, a cannula 2300, and a stylet 2400. The housing 2100 may comprise a housing top 2102 and housing bottom 2162. The housing top 2102 may comprise a proximal end 2122, a distal end 2124, a main body portion 2126, a grooved portion 2128, and slot 2140. Slot 2140 may comprise distal finger portion 2148, middle portion 2154, catch 2160 and end 2170. Distal finger portion 2148 may comprise right finger 2150 and left finger 2152. Middle portion 2154 may comprise left middle portion 2156 and right middle portion 2158. Catch 2160 may comprise right finger 2161 and left finger 2163. The housing bottom 2162 may comprise a proximal end 2164, a distal end 2166, a main body portion 2168, a grooved portion 2169, and a guiding portion 2180. Guiding portion 2180 may comprise proximal end 2182, distal end 2184, gap 2186, top face 2188, left wall 2190, and right wall 2192. Trigger 2220 may comprise an actuator 2222, a connecting portion 2230, a cannula engaging portion 2240, and a housing engaging portion 2250. Actuator 2222 may comprise ribs 2224 and middle rib 2226. Cannula engaging portion 2240 may comprise bore 2242. Housing engaging portion 2250 may comprise a protruding portion 2252. Cannula 2300 may comprise a proximal end 2302, a main body 2304, a retention mechanism 2306, a distal end 2308 and a bore 2310. Stylet 2400 may comprise a proximal end 2402 and a distal end 2408. Proximal end 2402 may further comprise bend 2404 and engaging portion 2406.

These components may be included with or without a marker as described below.

In alternative embodiments, the inserter device and/or inserter device system may or may not comprise a protective cover for a sharp, cutting edge of the insertion device.

In alternative embodiments, the system comprising the components may be included in various types of packaging or transportation and organizational components.

Figure 14:
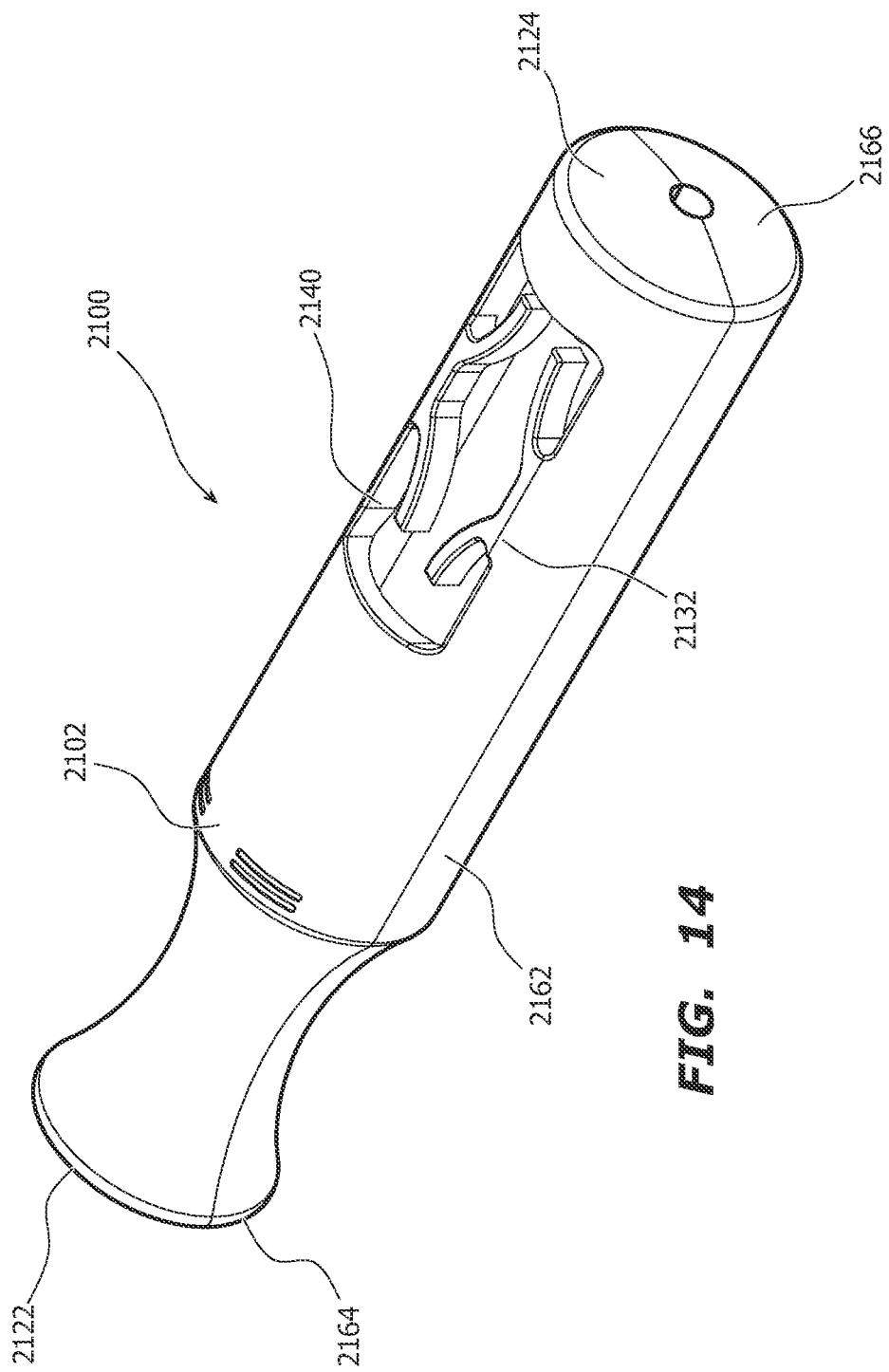
FIG. 14 is an exemplary embodiment of the housing of the marker inserter device of FIG. 12.
Figure 15:
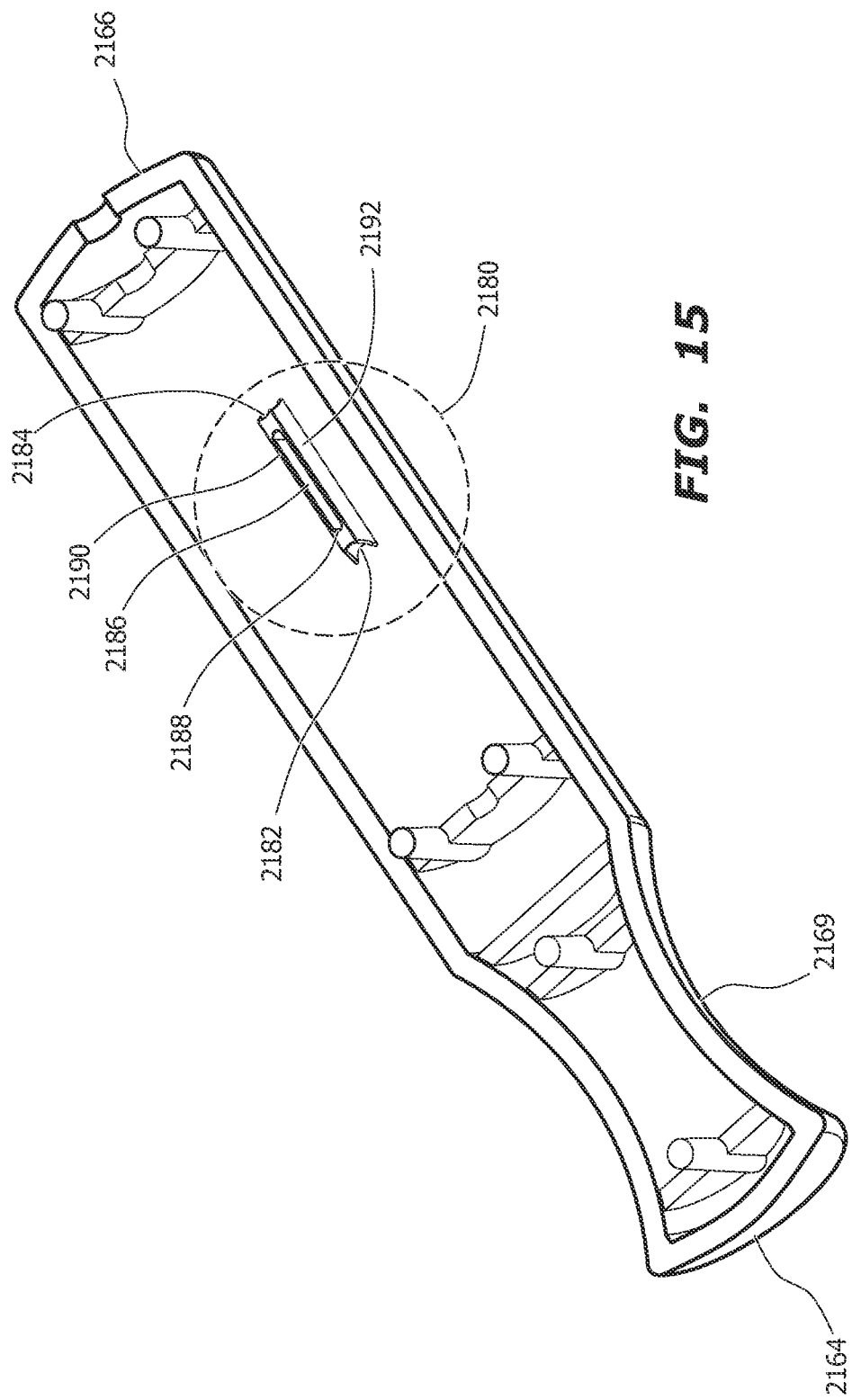
FIG. 15 is an exemplary embodiment of a housing bottom of the marker inserter device of FIG. 12.
Figure 16:
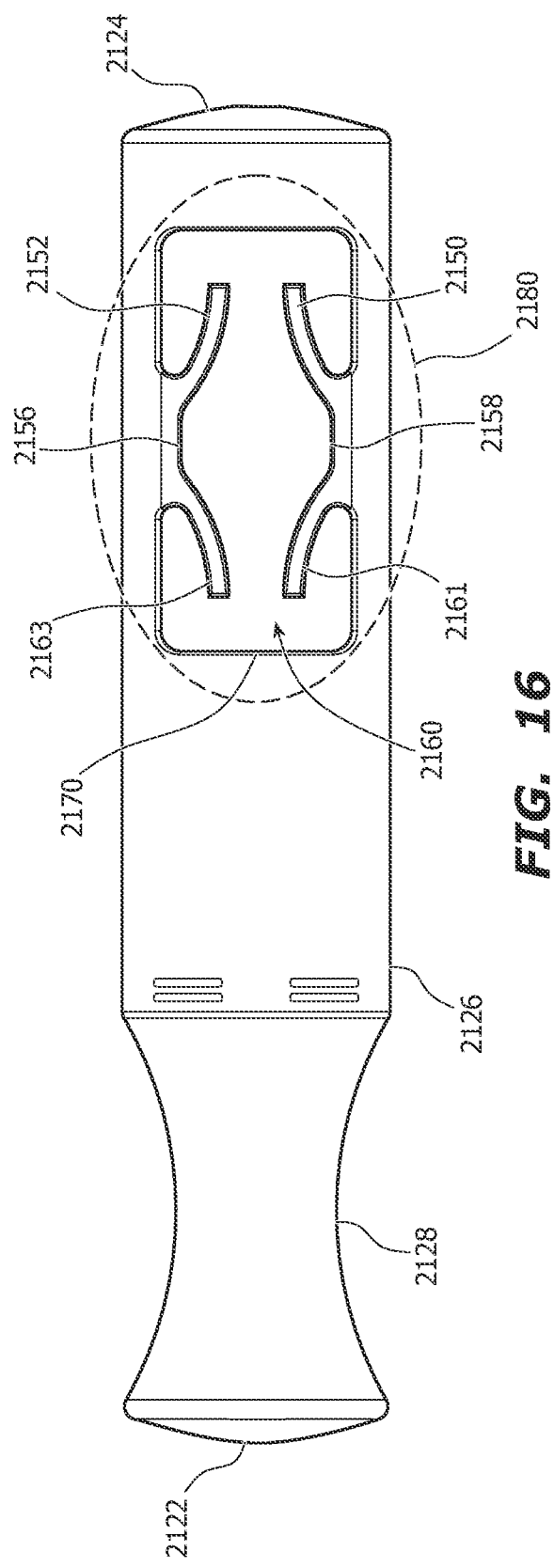
FIG. 16 is an exemplary embodiment of a housing top of the marker inserter device of FIG. 12.

In an exemplary embodiment, FIGS. 14-16 illustrate the housing 2100, and housing top 2102 and housing bottom 2162 portions. Housing bottom 2162 and housing top 2102 portions may be joined together to form housing 2100 through use of screws, snap fits, adhesives, or any combination of such. It is recognized that a person of ordinary skill in the art, having the benefit of this disclosure, could easily provide multiple methods of joining the housing top 2102 and housing bottom 2162.

FIGS. 14-15 show an exemplary embodiment of the housing bottom 2162 of the marker inserter device 2000. Housing bottom 2162 may comprise a proximal end 2164, a distal end 2166, a main body portion 2168, a grooved portion 2169, and a guiding portion 2180. Guiding portion 2180 may comprise proximal end 2182, distal end 2184, gap 2186, top face 2188, left wall 2190, and right wall 2192.

FIGS. 14 and 16 show an exemplary embodiment of the housing top 2102 which may comprise a proximal end 2122, a distal end 2124, a main body portion 2126, a grooved portion 2128, and slot 2140.

Slot 2140 may comprise distal finger portion 2148, middle portion 2154, catch 2160, and end 2170. Distal finger portion 2148 may comprise right finger 2150 and left finger 2152. Middle portion 2154 may comprise left middle portion 2156 and right middle portion 2158. Catch 2160 may comprise right finger 2161 and left finger 2163.

Figure 17A:
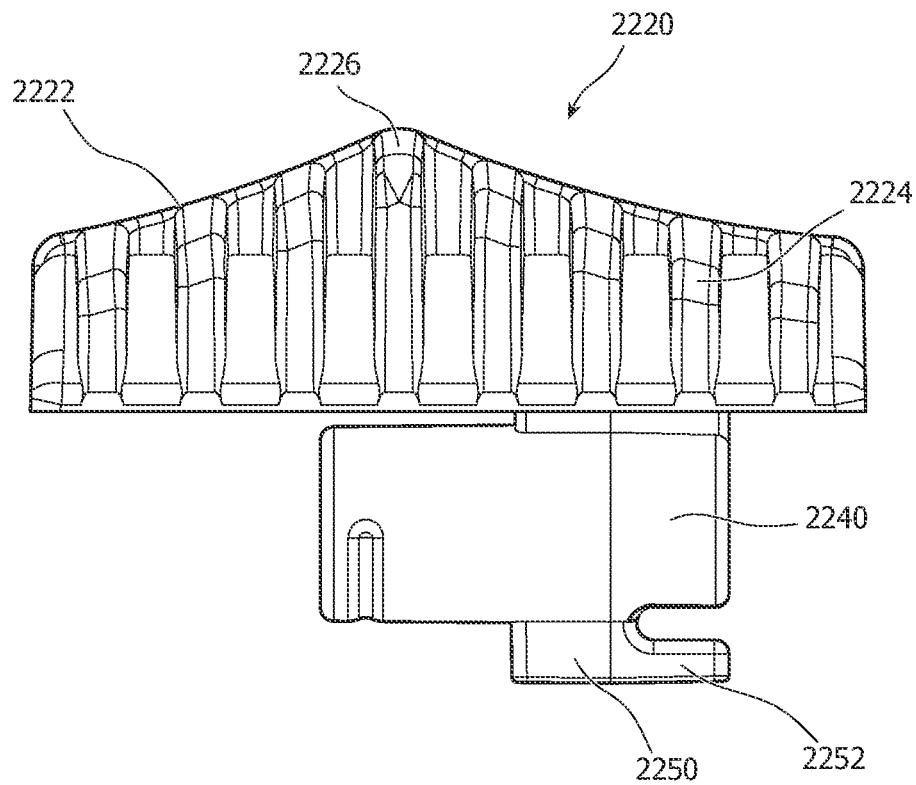
FIG. 17A is a side view of an exemplary embodiment of a trigger of the marker inserter device of FIG. 12.
Figure 17B:
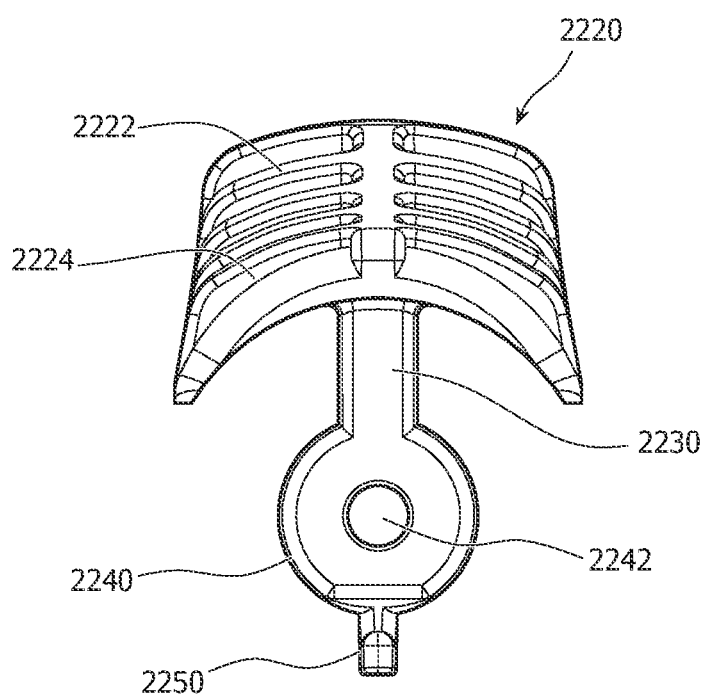
FIG. 17B is a front view of an exemplary embodiment of a trigger of the marker inserter device of FIG. 12.
Figure 17C:
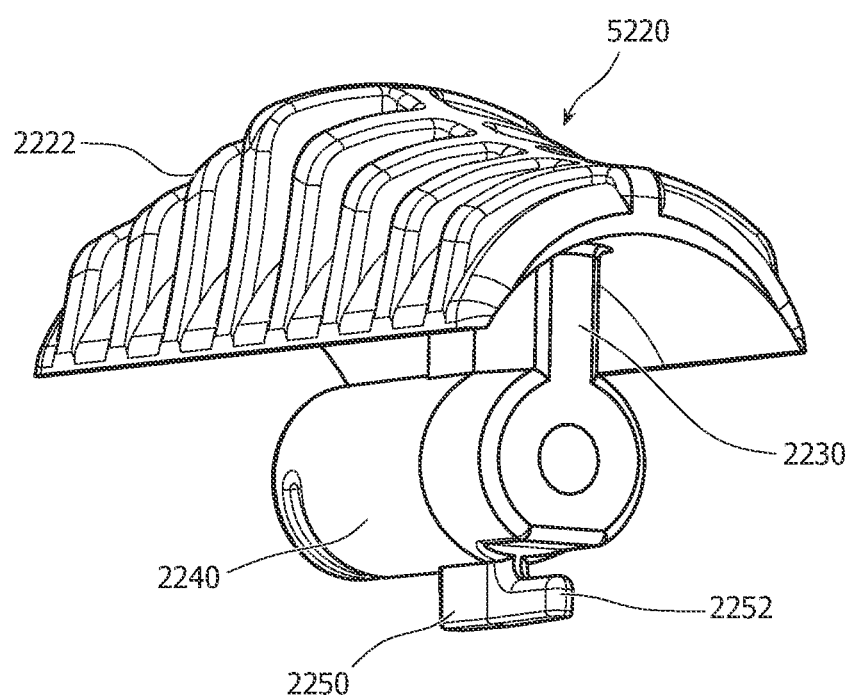
FIG. 17C is a perspective view of an exemplary embodiment of a trigger of the marker inserter device of FIG. 12.

In an exemplary embodiment, FIGS. 17A-17C illustrate the trigger 2220 of the marker inserter device 2000. Trigger 2220 may comprise an actuator 2222, a connecting portion 2230, a cannula engaging portion 2240, and a housing engaging portion 2250. Actuator 2222 may comprise ribs 2224 and middle rib 2226. Cannula engaging portion 2240 may comprise bore 2242. Housing engaging portion 2250 may comprise a protruding portion 2252 and slot 2254.

In an exemplary embodiment, FIG. 18 illustrates the cannula 2300 of the marker inserter device 2000. Cannula 2300 may comprise a proximal end 2302, a main body 2304, a retention mechanism 2306, a distal end 2308 and a bore 2310.

In an exemplary embodiment, FIG. 19 illustrates the stylet 2400. Stylet 2400 may comprise a proximal end 2402 and a distal end 2408. Proximal end 2402 may further comprise bend 2404 and engaging portion 2406.

Various types of markers can be used in conjunction with the device. A person of ordinary skill in the art will be able to design or envision various other markers and types of markers that take advantage of radar, x-ray, mammography, RFID, or any other imaging and localization techniques typically used in short-distance localization, particularly in the medical field.

As illustrated in FIGS. 20-22, in an embodiment the device may be in a first position, a second position, or a third position. In the first position, the marker may be undeployed and the inserter device may be ready to be inserted and actuated. To transition the marker inserter device into the second position, the user may rotate the actuator 2222 of the trigger 2220 in either direction about a longitudinal axis of the device. This rotation may overcome a retaining force provided by the distal finger portion 2148 of the housing. To transition the marker into the third position the user may move the actuator 2222 of the trigger 2220 proximally, to its proximal most position. In entering the third position, the trigger may move past catch 2160 of housing 2100 such that the trigger is locked in the third position. Retracting the trigger 2220 to its third and proximal most position with respect to the housing may draw the cannula 2300 to its proximal most position with respect to the housing. This may expose, and therein deploy, the marker from the device once the trigger has moved into the third position.

As seen in FIGS. 20A and 20B, in an embodiment of the device, in the first position cannula 2300 and trigger 2220 may be at their most distal position. In this position connecting portion 2230 may be in contact with distal finger portion 2148 of the housing top 2102. This contact may serve to provide a force against rotational movement of the trigger about a longitudinal axis of the device. More specifically, bendable left and right fingers 2152 and 2150 may push against connecting portion 2230 of trigger 2220.

To secure the trigger 2220 against proximal movement and accidental retraction of the cannula, housing engaging portion 2250 of trigger 2220 may engage with distal end 2184 of guiding portion 2180 of the housing bottom 2162. More specifically, distal end 2184 of guiding portion 2180 may provide a force against proximal retraction of the trigger 2220. In this position, the marker 2500 may rest within a distal portion of the cannula.

As seen in FIGS. 20A and 20B, in an embodiment of the device, to transition into the second position, a user may overcome the force provided by distal finger portion 2148 on connecting portion 2230. A user may move the actuator 2222 of the trigger to the lateral left or right, thereby rotating the trigger 2220 about a longitudinal axis of the marker. This rotation may cause the connecting portion 2230 to push against and bend either left finger 2152 or right finger 2150 to allow trigger 2220 to rotate about a longitudinal axis of the device. Thus, force from a user may cause the device to enter the second position.

In this way, actuator 2222 of the trigger 2220 may be moved laterally until housing engaging portion 2250 of the trigger is no longer restrained from proximal retraction by distal end 2284 of guiding portion 2180.

In the second position the trigger may be retracted proximally, which may cause cannula 2300 to retract. While being retracted proximally, the connecting portion 2230 of the trigger 2220 may be in contact with left middle portion 2156 or right middle portion 2158 of middle portion 2154 of the housing top 2102, while the housing engaging portion 2250 of the trigger 2220 may be in contact with the left wall 2190 or right wall 2192 of guiding portion 2180 of the housing bottom. These two contact points may slidingly engage with the trigger. These two contact points may also guide the trigger 2220 such that trigger 2220 cannot be rotated, only retracted.

Figure 22A:
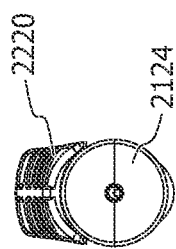
FIG. 22A is a front view of an exemplary embodiment of the marker inserter device in a third position of FIG. 12.
Figure 22B:
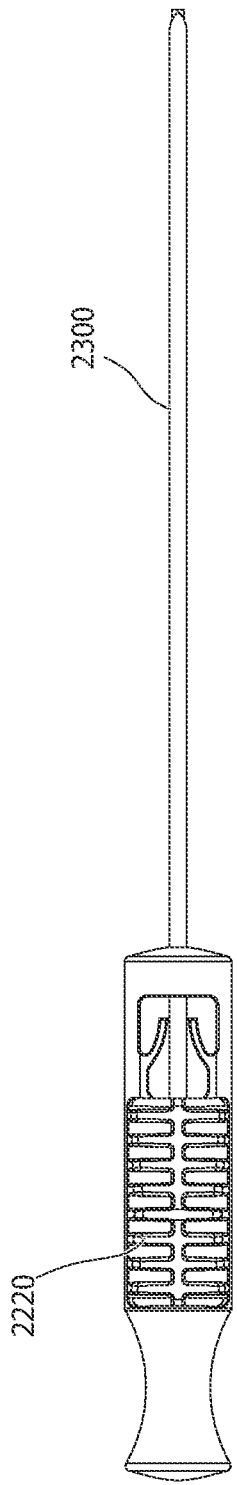
FIG. 22B is a side view of an exemplary embodiment of the marker inserter device in a third position of FIG. 12.

As seen in FIGS. 22A and 22B, in one embodiment, the device may comprise a catch 2160 to lock the device in the third position, or otherwise stated, the device may comprise a catch 2160 such that the device may not be taken out of the third position once it has transitioned into the third position.

In some embodiments this catch may comprise right and left fingers 2161 and 2163 that may provide a force on connecting portion 2230 as the connecting portion 2230 of trigger 2220 is moved into contact with the fingers. The force provided by fingers 2161 or 2163 may rotate the trigger around an longitudinal axis of the inserter device.

Once connecting portion 2230, and trigger 2220 has been retracted proximal the catch 2160 and fingers 2161 and 2163, the fingers may retake their original, unbent position, and provide a force against the distal movement of the trigger 2220 and connecting portion 2230. In other words, the catch 2160 may serve to provide one-way, proximal motion of the trigger.

We claim:

1. A system for implanting a marker, the system comprising:
    a marker insertion device comprising:
        a housing coupled to a stylet; and
        a trigger coupled to a cannula, the trigger operatively coupled to the housing such that a portion of the stylet is disposed within the cannula,
        wherein the housing comprises a retaining portion configured to retain the trigger in a first position relative to the housing;
        wherein the trigger is configured to rotate about a longitudinal axis of the marker insertion device to transition from the first position to a second position;
        wherein the trigger is configured to move proximally from the second position to a third position to retract the cannula and deploy the marker; and
        wherein the trigger further comprises an actuator portion, wherein a lateral movement of the actuator portion of the trigger relative to the housing is configured to rotate the trigger about the longitudinal axis of the marker insertion device.

2. The system of claim 1, wherein in the first position, the stylet is disposed within the cannula in an undeployed state.

3. The system of claim 1, wherein the trigger further comprises a cannula engaging portion and a connecting portion connecting the actuator portion and cannula engaging portion, and wherein the cannula engaging portion includes a bore coupled to the cannula.

4. The system of claim 1, wherein the trigger further comprises a housing engaging portion with a slot configured to receive the retaining portion of the housing.

5. The system of claim 4, wherein the retaining portion further comprises a deflectable portion,
    wherein the retaining portion further comprises a raised portion on the deflectable portion, wherein the raised portion engages with the housing engaging portion of the trigger, and wherein the raised portion disengages with the housing engaging portion when a user moves the actuator portion of the trigger.

6. The system of claim 1, wherein the trigger engages with the retaining portion of the housing.

7. The system of claim 1, wherein the housing further comprises a guiding portion to engage with the trigger as the trigger is retracted.

8. The system of claim 1, wherein the trigger is configured to simultaneously engage with a slot in the housing, and a guiding portion of the housing, as the trigger is retracted.

9. The system of claim 1, wherein retracting the trigger proximally retracts the cannula proximally.

10. The system of claim 1, wherein the housing further comprises a catch configured to retain the trigger in the third position.

11. The system of claim 10, wherein the catch is configured to engage with a connecting portion of the trigger.

12. The system of claim 11, wherein the connecting portion of the trigger is retractable beyond the catch.

13. The system of claim 1, wherein the trigger, when in the third position, has a same axial orientation as when in the first position, with respect to rotation about a bore of the trigger.

14. The system of claim 1, wherein a distal tip of the stylet is configured to remain stationary with respect to an insertion medium as the trigger enters the third position.

15. The system of claim 1, wherein the system further comprises a marker.

16. A marker insertion device comprising:
    a housing coupled to a stylet; and
    a trigger coupled to a cannula, the stylet slidably disposed within the cannula,
    wherein the housing comprises a retaining portion to retain the trigger in a first position relative to the housing;
    wherein the trigger is configured to rotate about a longitudinal axis of the marker insertion device to transition from the first position to a second position;
    wherein the trigger is configured to move proximally from the second position to a third position to retract the cannula and deploy the marker;
    wherein the lateral movement of an actuator portion of the trigger relative to the housing is configured to disengage the trigger and the retaining portion;
    wherein the proximal movement of the actuator portion relative to the housing is configured to retract the cannula and deploy the marker; and
    wherein the lateral movement of the actuator portion of the trigger relative to the housing is configured to rotate the trigger about the longitudinal axis of the marker insertion device.

* * * * *